(12) United States Patent
Li et al.

(10) Patent No.: US 10,142,041 B2
(45) Date of Patent: Nov. 27, 2018

(54) HOMODYNE RECEIVER CALIBRATION (71) Applicant: TELEFONAKTIEBOLAGET LM ERICSSON (PUBL), Stockholm (SE)

(72) Inventors: Ming Li, Beijing (CN); Youping Su, Täby (SE); Björk Vimar, Göteborg (SE); Mats Klingberg, Stockholm (SE); Gerlach Spee, Ösmo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/751,698

(22) PCT Filed: Aug. 11, 2015

(86) PCT No.: PCT/CN2015/086645
§ 371 (c)(1),
(2) Date: Feb. 9, 2018

(87) PCT Pub. No.: WO2017/024522
PCT Pub. Date: Feb. 16, 2017

(65) Prior Publication Data
US 2018/0234194 A1 Aug. 16, 2018

(51) Int. Cl.
*H04B 17/21* (2015.01)
*H04L 27/38* (2006.01)
*H04B 1/30* (2006.01)

(52) U.S. Cl.
CPC ............... *H04B 17/21* (2015.01); *H04B 1/30* (2013.01); *H04L 27/3863* (2013.01); *H04L 27/3872* (2013.01)

(58) Field of Classification Search
CPC combination set(s) only.
See application file for complete search history.

(56) References Cited

U.S. PATENT DOCUMENTS

| 4,119,940 | A | | 10/1978 | Keating et al. |
| 4,179,694 | A | * | 12/1979 | Alder ........................ G01S 7/28 342/100 |
| 5,117,377 | A | | 5/1992 | Finman |

(Continued)

FOREIGN PATENT DOCUMENTS

| CN | 101938438 A | 1/2011 |
| JP | H08256079 A | 10/1996 |
| WO | 2014000807 A1 | 1/2014 |

*Primary Examiner* — Junpeng Chen (57) ABSTRACT

There is disclosed mechanisms for calibrating a homodyne receiver in a signal distribution network for time division duplex; a corresponding method is performed by a baseband calibration module. The method comprises acquiring a transmission signal being input to a homodyne transmitter of the signal distribution network; acquiring, from a heterodyne transmitter observation receiver of the signal distribution network, a first received version of the transmission signal; acquiring, from a homodyne receiver of the signal distribution network, a second received version of the transmission signal; and, calibrating the homodyne receiver using a comparison of the first received version of the transmission signal and the second received version of the transmission signal, using the first received version of the transmission signal as a reference signal, and using the transmission signal as a calibration signal.

20 Claims, 8 Drawing Sheets (56) References Cited

U.S. PATENT DOCUMENTS

| | | | |
|---|---|---|---|
| 5,826,180 A | 10/1998 | Golan | |
| 7,215,716 B1* | 5/2007 | Smith | H03F 1/3247 |
| | | | 375/284 |
| 9,025,645 B2* | 5/2015 | Al-Qaq | H04B 17/17 |
| | | | 375/219 |
| 2004/0219884 A1* | 11/2004 | Mo | H03D 3/009 |
| | | | 455/67.11 |
| 2008/0187038 A1 | 8/2008 | Currivan et al. | |
| 2009/0130981 A1* | 5/2009 | Nagai | G06K 19/0723 |
| | | | 455/63.1 |
| 2010/0159837 A1* | 6/2010 | Dent | H04B 1/525 |
| | | | 455/63.1 |
| 2015/0280946 A1* | 10/2015 | Sabouri | H04L 25/063 |
| | | | 375/319 |

* cited by examiner

HOMODYNE RECEIVER CALIBRATION

This application is a national stage application, filed under 35 U.S.C. § 371, claiming priority to international application PCT/CN2015/086645, filed Aug. 11, 2015, the disclosure of which is fully incorporated herein by reference.

TECHNICAL FIELD

Embodiments presented herein relate to calibration of a homodyne receiver, and particularly to a method, a baseband calibration module, a computer program, and a computer program product for calibrating a homodyne receiver in a signal distribution network for time division duplex.

BACKGROUND

In communications networks, there may be a challenge to obtain good performance and capacity for a given communications protocol, its parameters and the physical environment in which the communications network is deployed.

For example, cellular technologies specified by the third Generation Partnership Program (3GPP) are widely deployed. One evolution into an evolved radio access technology is referred to as Long-Term Evolution (LTE). In LTE, different modes of communication can be used for devices (such as radio access network nodes and wireless terminals) in a cellular network, such as Frequency Division Duplex (FDD), Time Division Duplex (TDD), and half duplex.

In TDD, the uplink (i.e., transmission from wireless terminal to radio access network node) and the downlink (i.e., transmission from radio access network node to wireless terminal) communication between the radio access network node and the wireless terminal use the same frequency band but different time slots to separate the receive (RX) and transmit (TX) instances, i.e. the RX and TX instances take place in different, non-overlapping, time slots.

Figure 1:
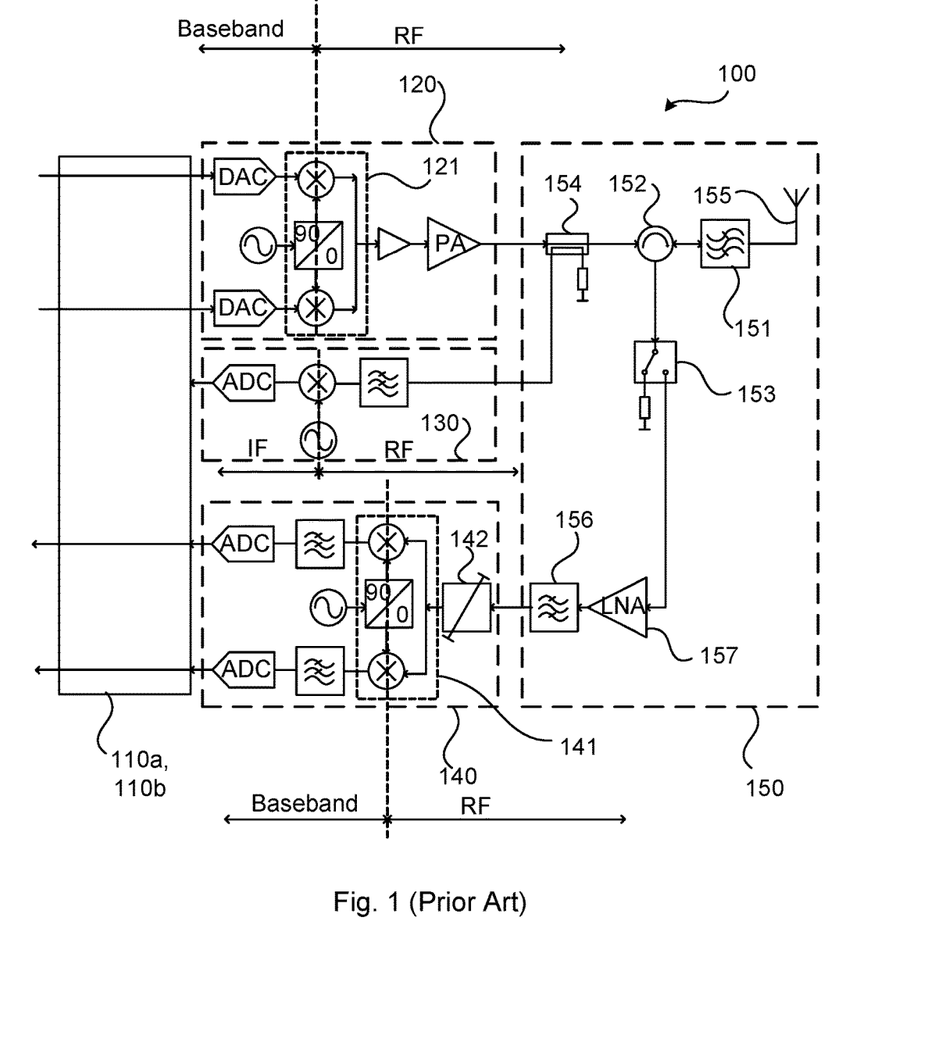
FIG. 1 is a schematic diagram illustrating a signal distribution network according to state of the art.

A typical signal distribution network 100 of a TDD radio structure including baseband circuitry 110a, 110b is shown in FIG. 1. The signal distribution network 100 further comprises a direct up-conversion homodyne transmitter 120, a heterodyne transmitter observation receiver (TOR) 130, a homodyne receiver 140, and radio circuitry 150. Baseband circuitry 110a is configured for TX and baseband circuitry 100b is configured for RX.

The transmitter 120 inter alia comprises digital-to-analogue converters (DACs), an in-phase and quadrature (IQ) modulator 121, and amplifiers, such as power amplifiers (PAs). The transmitter observation receiver 130 inter alia comprises a low-pass filter, a down converter, and an analogue-to-digital converter (ADC) and receives a part of the signal transmitted by the homodyne transmitter 120 by means of a coupler 154. The receiver 140 inter alia comprises a variable gain amplifier 142, an in-phase and quadrature demodulator 141 configured for down-converting the carrier frequency to baseband, low-pass (baseband) filters, and ADCs. Due to RX and TX using the same frequency band in TDD systems, a two ports cavity filter 151 is shared for both receiver 140 and transmitter 120. A circulator 152 is configured to separate the TX path and the RX path. The reflected TX signal from the cavity filter 151 will pass through the switch 153 and be absorbed by termination during the TX time period. By means of the circulator 152 a signal can thus either be directed from the transmitter 120 to the antenna 155 or from the antenna 155 to the receiver 140. During the RX time period the receiver 140 thus receives a reception signal from the switch 153 through a low noise amplifier (LNA) 157 and a band-pass (radio frequency) filter 156.

Homodyne receivers 140 may offer a cost benefit and potential performance advantage over traditional heterodyne receivers. In addition, a homodyne receiver architecture may offer more freedom in addressing multi standard operation and multiple frequency bands of operation using a single hardware module. Homodyne receivers 140 enable eliminating intermediate frequency (IF) stages, thus reducing the number of components compared to heterodyne receivers. Further, directly converting the received signal to effectively zero-IF frequency enables image problems associated with super heterodyne architectures to be ignored.

As noted above, in the homodyne receiver 140, after low-noise amplification, the desired carrier frequency is down-converted to baseband using an IQ demodulator 141. Using a local oscillator (LO), the IQ demodulator 141 generates sum and difference frequencies at the output ports, where low pass filters heavily reject the summation frequency and allow only the difference frequency to pass.

However, some challenges are associated with homodyne receivers 140. One challenge is handling of IQ impairments. IQ amplitude and phase mismatch can cause degraded signal-to-noise (SNR) performance. In an ideal IQ demodulator 141, the baseband IQ signals share a perfect 90° phase relationship between in-phase (I) and quadrature (Q) vectors, and are said to be in perfect quadrature. When IQ signals mismatch, the I and Q vector discrimination will suffer from amplitude and phase errors, which degrade the recovered SNR for the received signals of interest.

Mitigation of IQ impairments may be achieved by proper calibration of the homodyne receiver 140. Some known proposed mechanisms for mitigating IQ impairments in the receiver 140 will be summarized next.

A first group of mechanisms considers the use of prior information, such as pilot tones, about the transmitted signal. This requires calibration of the receiver 140 at startup. As an example, international patent application with publication number WO2014/000807 discloses a receiver device comprising an adaptive IQ correction component arranged to correct IQ errors in an output baseband signal.

A second group of mechanisms additionally considers so called blind compensation, i.e. mechanisms where no prior knowledge about the transmitted signal is available.

A third group of mechanisms considers the use of an auxiliary receiver to provide a reference to the nominal receiver.

Drawbacks of these known proposed mechanisms for mitigating IQ impairments will be summarized next.

The first group of mechanisms needs a pilot tone if calibration is used or a known sequence of data if an a priori solution is chosen. This may lead to delays or a lower transmission throughput due to the need to schedule the known sequence in addition to the payload intended for transmission.

Regarding the use of blind compensation techniques as considered in the second group of mechanisms, such techniques have generally turned out to have poor performance.

The third group of mechanisms requires additional hardware which may occupy a significant printed circuit board size and cost increases as well, especially in multi-branch receiver architectures.

Hence, there is still a need for an improved calibration of a homodyne receiver.

SUMMARY

An object of embodiments herein is to provide efficient calibration of a homodyne receiver.

According to a first aspect there is presented a method for calibrating a homodyne receiver in a signal distribution network for time division duplex. The method is performed by a baseband calibration module. The method comprises acquiring a transmission signal being input to a homodyne transmitter of the signal distribution network. The method comprises acquiring, from a heterodyne transmitter observation receiver of the signal distribution network, a first received version of the transmission signal. The method comprises acquiring, from a homodyne receiver of the signal distribution network, a second received version of the transmission signal. The method comprises calibrating the homodyne receiver using a comparison of the first received version of the transmission signal and the second received version of the transmission signal, using the first received version of the transmission signal as a reference signal, and using the transmission signal as a calibration signal.

Advantageously this provides efficient calibration of a homodyne receiver.

Advantageously this allows for the transmission signal from the homodyne transmitter to be used as a calibration signal, and the first received version of the transmission signal from the heterodyne transmitter observation receiver to be used as a reference signal, without requiring any extra signal stimulation source.

Advantageously this provides real time detection and calibration.

Advantageously this enables transmitter residue IQ impairments to be considered and mitigated.

According to a second aspect there is presented a baseband calibration module for calibrating a homodyne receiver in a signal distribution network for time division duplex. The baseband calibration module comprises processing circuitry. The processing circuitry is configured to cause the baseband calibration module to perform a set of operations. The processing circuitry is configured to cause the baseband calibration module to acquire a transmission signal being input to a homodyne transmitter of the signal distribution network. The processing circuitry is configured to cause the baseband calibration module to acquire, from a heterodyne transmitter observation receiver of the signal distribution network, a first received version of the transmission signal. The processing circuitry is configured to cause the baseband calibration module to acquire, from a homodyne receiver of the signal distribution network, a second received version of the transmission signal. The processing circuitry is configured to cause the baseband calibration module to calibrate the homodyne receiver using a comparison of the first received version of the transmission signal and the second received version of the transmission signal, using the first received version of the transmission signal as a reference signal, and using the transmission signal as a calibration signal.

Advantageously this allows for a cost-efficient hardware implementation of the baseband calibration module.

According to a third aspect there is presented a computer program for calibrating a homodyne receiver in a signal distribution network for time division duplex, the computer program comprising computer program code which, when run on a baseband calibration module, causes the baseband calibration module to perform a method according to the first aspect.

According to a fourth aspect there is presented a computer program product comprising a computer program according to the third aspect and a computer readable means on which the computer program is stored.

According to a fifth aspect there is presented a signal distribution network comprising a baseband calibration module according to the second aspect.

According to a sixth aspect there is presented network node comprising a baseband calibration module according to the second aspect.

According to a seventh aspect there is presented wireless terminal comprising a baseband calibration module according to the second aspect.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. In the flowcharts, any step illustrated by a dashed line should be regarded as optional.

The present disclosure relates generally to mechanisms for time division duplex radio receiver impairment calibration using a transmitter observation receiver. The embodiments disclosed herein particularly relate to mechanisms for calibrating a homodyne receiver 140 in a signal distribution network for time division duplex. In order to obtain such mechanisms there is provided a baseband calibration module, a method performed by the baseband calibration module, a computer program comprising code, for example in the form of a computer program product, that when run on a baseband calibration module, causes the baseband calibration module to perform the method.

Figure 7:
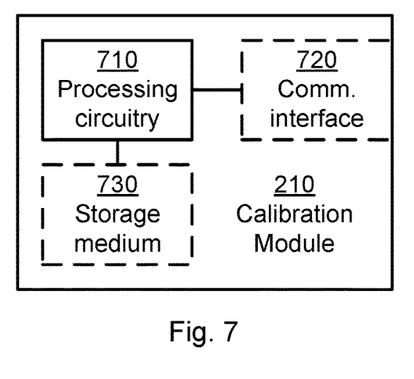
FIG. 7 is a schematic diagram showing functional units of a baseband calibration module according to an embodiment.

FIG. 7 schematically illustrates, in terms of a number of functional units, the components of a baseband calibration module 210 according to an embodiment. Processing circuitry 710 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 1110 (as in FIG. 11), e.g. in the form of a storage medium 730.

Particularly, the processing circuitry 710 is configured to cause the baseband calibration module 210 to perform a set of operations, hereinafter denoted as steps, S102-S112a. These operations, or steps, S102-S112a will be disclosed below. For example, the storage medium 730 may store the set of operations, and the processing circuitry 710 may be configured to retrieve the set of operations from the storage medium 730 to cause the baseband calibration module 210 to perform the set of operations. The set of operations may be provided as a set of executable instructions. Thus the processing circuitry 710 is thereby arranged to execute methods as herein disclosed.

The storage medium 730 may also comprise persistent storage, which, for example, can be any single one or combination of magnetic memory, optical memory, solid state memory or even remotely mounted memory. The baseband calibration module 210 may further comprise a communications interface 720 for communications with other entities, units, modules, devices, and/or components of the signal distribution network 200, 300, 400, 500, 600 and baseband circuitry 110a, 110b. The processing circuitry 710 controls the general operation of the baseband calibration module 210 e.g. by sending data and control signals to the communications interface 720 and the storage medium 730, by receiving data and reports from the communications interface 720, and by retrieving data and instructions from the storage medium 730. Other components, as well as the related functionality, of the baseband calibration module 210 are omitted in order not to obscure the concepts presented herein.

Figure 8:
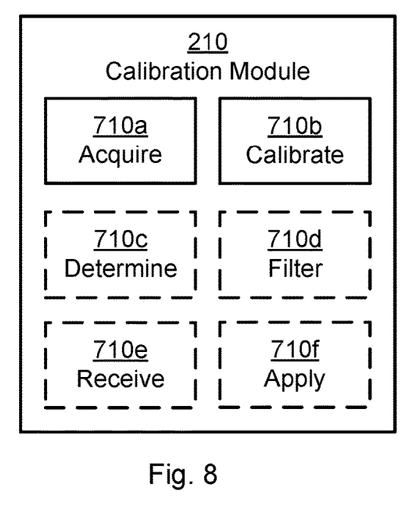
FIG. 8 is a schematic diagram showing functional modules of a baseband calibration module according to an embodiment.

FIG. 8 schematically illustrates, in terms of a number of functional modules, the components of a baseband calibration module 210 according to an embodiment. The functionality of each functional module 710a-710f will be further disclosed below in the context of which the functional modules 710a-710f may be used. The baseband calibration module 210 of FIG. 8 comprises a number of functional modules; an acquire module 710a configured to perform below steps S102, S104, S106, and a calibrate module 710b configured to perform below step S108. The baseband calibration module 210 of FIG. 8 may further comprises a number of optional functional modules, such as any of a determine module 710c configured to perform below steps S108c, S108b, a filter module 710d configured to perform below steps S108a, S112a, a receive module 710e configured to perform below step S110, and an apply module 710d configured to perform below step S112. In general terms, each functional module 710a-710f may be implemented in hardware or in software. Preferably, one or more or all functional modules 710a-710f may be implemented by the processing circuitry 710, possibly in cooperation with functional units 720 and/or 730. The processing circuitry 710 may thus be arranged to from the storage medium 730 fetch instructions as provided by a functional module 710a-710f and to execute these instructions, thereby performing any steps as will be disclosed hereinafter.

The baseband calibration module 210 may be provided as a standalone device or as a part of a further device. For example, the baseband calibration module 210 may be provided in signal distribution network 200, 300, 400, 500, 60o. Hence, a signal distribution network 200, 300, 400, 500, 600 may comprise a baseband calibration module 210 as herein disclosed. The signal distribution network 200, 300, 400, 500, 600 may be part of a network node (such as a radio access network node, a radio base station, a base transceiver station, a nodeB, or an evolved nodeB). The signal distribution network 200, 300, 400, 500, 600 may additionally or alternatively be part of a terminal device (such as a mobile station, mobile phone, handset, wireless local loop phone, user equipment (UE), smartphone, laptop computer, tablet computer, or modem).

Figure 9:
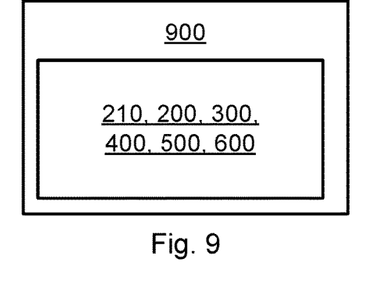
FIG. 9 is a schematic diagram showing functional units of a network node according to embodiments.
Figure 10:
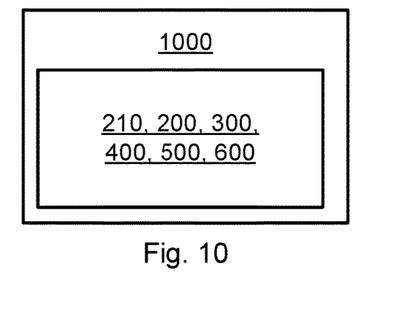
FIG. 10 is a schematic diagram showing functional units of a wireless terminal according to embodiments.

FIG. 9 schematically illustrates a network node 1000 comprising a baseband calibration module 210 or signal distribution network 200, 300, 400, 500, 600 comprising such a baseband calibration module 210. FIG. 10 schematically illustrates a terminal device 1000 comprising a baseband calibration module 210 or a signal distribution network 200, 300, 400, 500, 600 comprising such a baseband calibration module 210. The baseband calibration module 210 or the signal distribution network 200, 300, 400, 500, 600 may be provided as an integral part of the network node 900 or the terminal device 1000. That is, the components of the baseband calibration module 210 or the signal distribution network 200, 300, 400, 500, 600 may be integrated with other components of the network node 900 or terminal device 1000; some components of the network node 900 or terminal device 1000 and the baseband calibration module 210 or the signal distribution network 200, 300, 400, 500, 600 may be shared.

Figure 11:
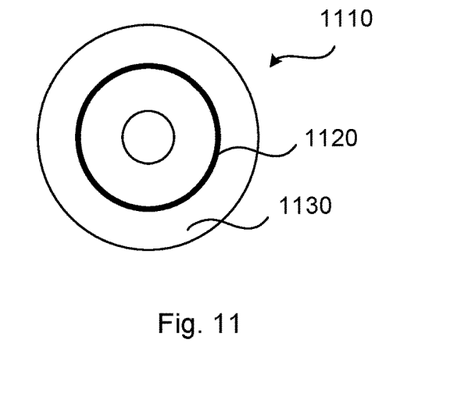
FIG. 11 shows one example of a computer program product comprising computer readable means according to an embodiment.

FIG. 11 shows one example of a computer program product 1110 comprising computer readable means 1130. On this computer readable means 1130, a computer program 1120 can be stored, which computer program 1120 can cause the processing circuitry 710 and thereto operatively coupled entities and devices, such as the communications interface 720 and the storage medium 730, to execute methods according to embodiments described herein. The computer program 1120 and/or computer program product 1110 may thus provide means for performing any steps as herein disclosed.

In the example of FIG. 11, the computer program product 1110 is illustrated as an optical disc, such as a CD (compact disc) or a DVD (digital versatile disc) or a Blu-Ray disc. The computer program product 1110 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120 is here schematically shown as a track on the depicted optical disk, the computer program 1120 can be stored in any way which is suitable for the computer program product 1110.

Figures 12, 13:
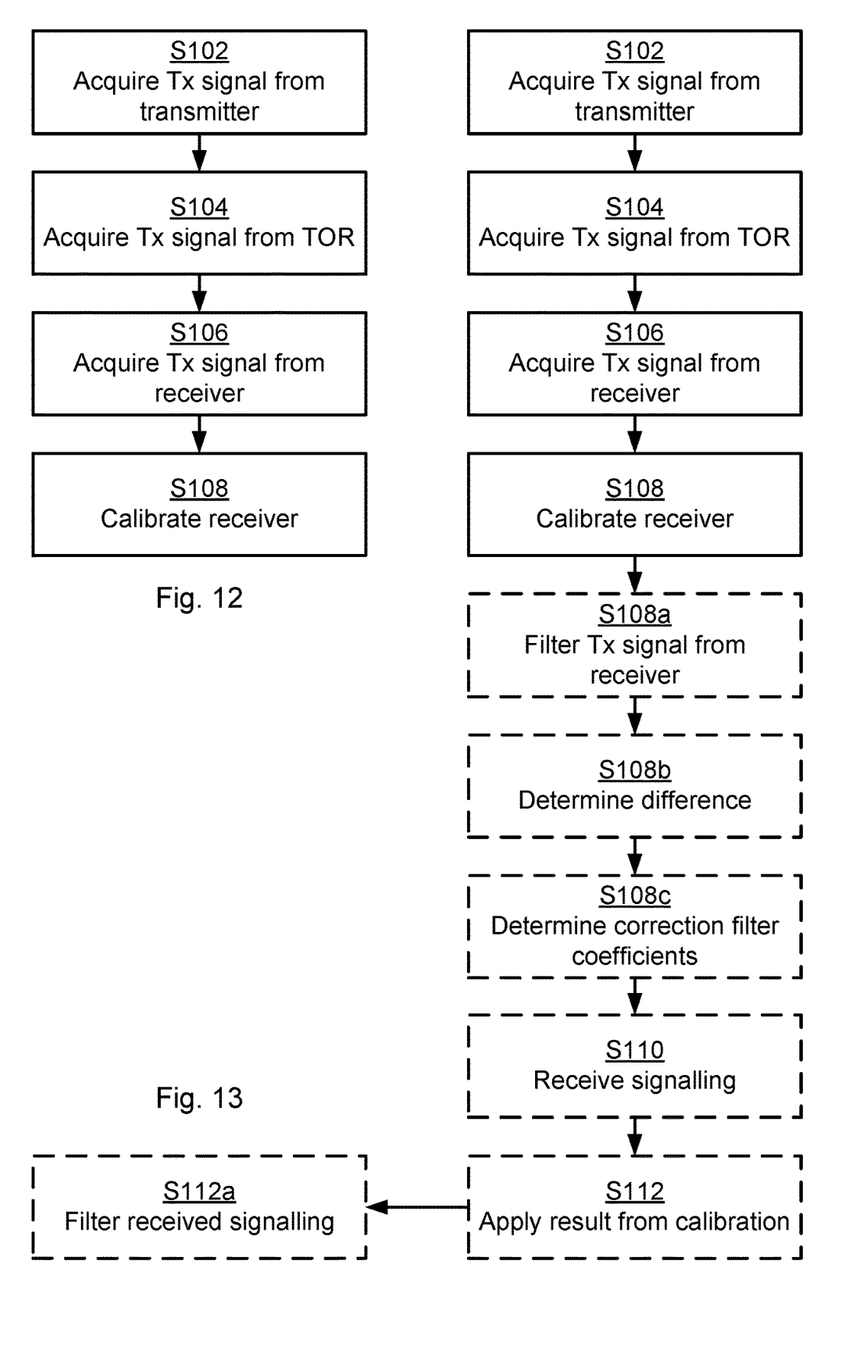
FIGS. 12 and 13 are flowcharts of methods according to embodiments.

FIGS. 12 and 13 are flow chart illustrating embodiments of methods for calibrating a homodyne receiver 140 in a signal distribution network 200, 300, 400, 500 for time division duplex. The methods are performed by the baseband calibration module 210. The methods are advantageously provided as computer programs 1120.

Figure 2:
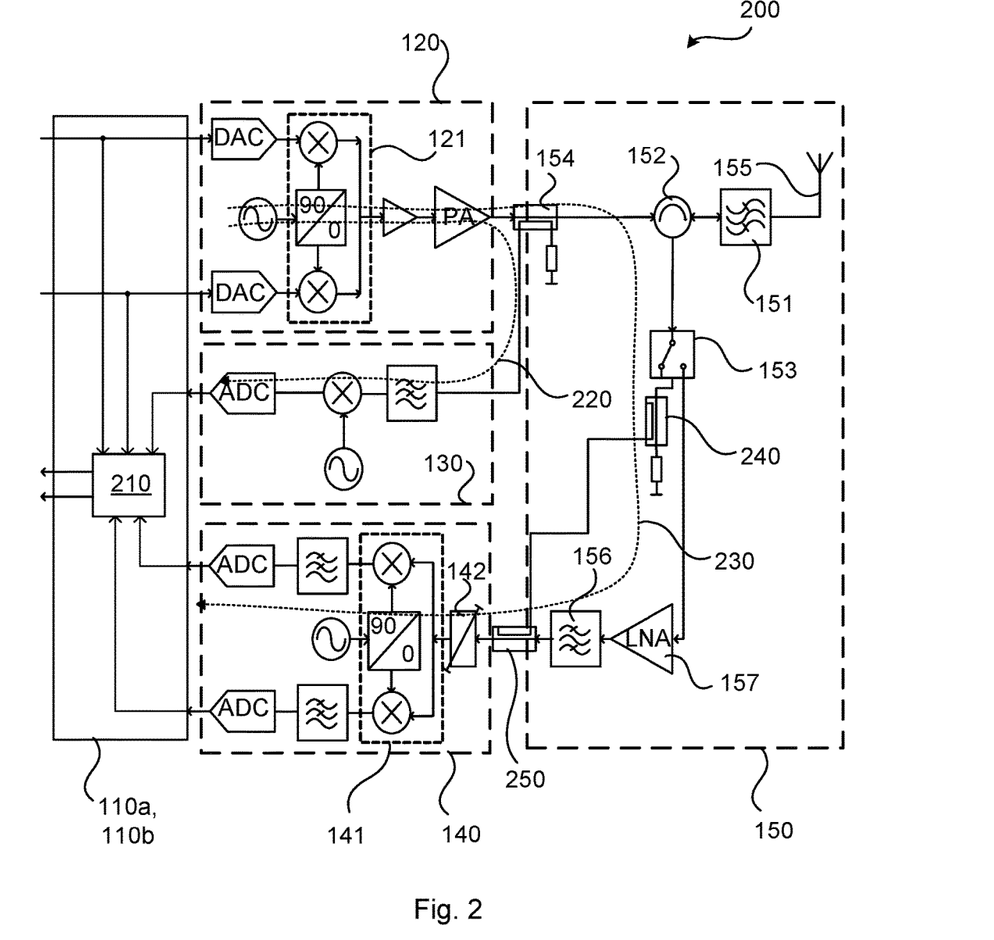
FIGS. 2, 3, 4, 5, and 6 are schematic diagrams illustrating signal distribution networks according to embodiments.
Figure 3:
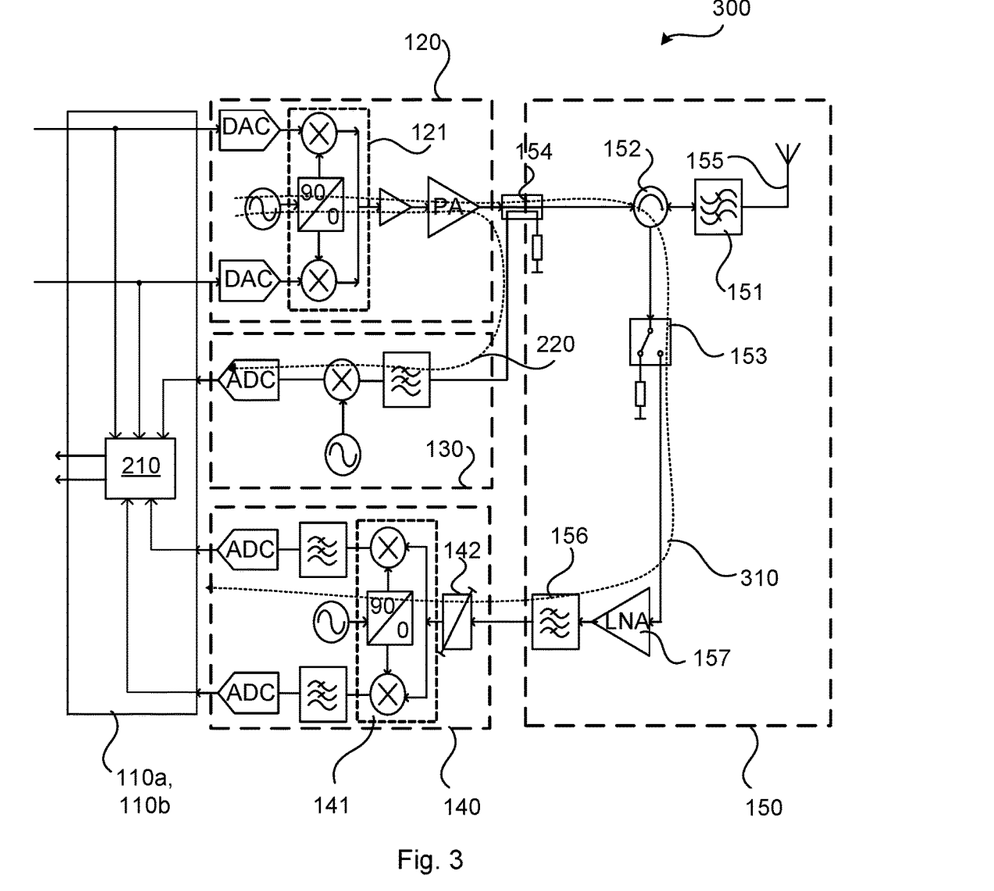

References are now made to the signal distribution networks 200, 300 of 300 FIGS. 2 and 3. The signal distribution networks 200, 300 are similar to the signal distribution network 100 of FIG. 1. In comparison to the signal distribution network 100, the signal distribution networks 200, 300 further comprises a baseband calibration module 210. The signal distribution network 200 further comprises a first coupler 240 and a second coupler 250. Details of the first coupler 240 and the second coupler 250 will be provided below. Further, in FIG. 2 a first signal path is identified at reference numeral 220 and a second signal path is identified at reference numeral 230. Further, in FIG. 3 an alternative second signal path is identified at reference numeral 310. Details of the signal paths 220, 230, 310 will be provided below.

Reference is now made to FIG. 12 illustrating a method for calibrating a homodyne receiver 140 in a signal distribution network 200, 300, 400, 500 for time division duplex as performed by the baseband calibration module 210 according to an embodiment. Parallel references are continued to FIGS. 2 and 3.

The homodyne transmitter 120 is configured to convert the I and Q parts of a baseband signal to analogue components by means of two DACs or one dual DAC. The output signals from the DACs are transposed to radio frequency (RF) by an IQ modulator (or quadrature up-converter) to form the final RF signal to be transmitted from the antenna 155. At least some of the herein disclosed embodiments are based on utilizing the transmission signal being input to the transmitter 120 as calibration signal. Hence, the baseband calibration module 210 is configured to, in a step S102, acquire a transmission signal being input to a homodyne transmitter 120 of the signal distribution network 200, 300, 400, 500. In this respect, the acquire module 710a may comprise instructions that when executed on the baseband calibration module 210 causes the processing circuitry 710 to, via the communications interface 720, acquire the transmission signal in order for the baseband calibration module 210 to perform step S102.

The input signal to the transmitter observation receiver 130 is forwarded to 300 an analog mixer with heterodyne architecture. The real analog output signal from the mixer is at IF frequency and is converted in an ADC. The resulting real digital signal is down-converted to a complex digital baseband signal in the digital domain. The transmitter observation receiver 130 is free of IQ impairment because IQ is produced in the digital domain and is therefore used as reference receiver. At least some of the herein disclosed embodiments are thus based on utilizing the transmitter observation receiver 130 as reference receiver. The baseband calibration module 210 is therefore configured to, in a step S104, acquire a first received version of the transmission signal from a heterodyne transmitter observation receiver 130 of the signal distribution network 200, 300, 400, 500. In this respect, the acquire module 710a may comprise instructions that when executed on the baseband calibration module 210 causes the processing circuitry 710 to, via the communications interface 720, acquire the first received version of the transmission signal in order for the baseband calibration module 210 to perform step S104. The first received version corresponds to the transmission signal as transmitted by the homodyne transmitter 120 and received by the heterodyne transmitter observation receiver 130.

The signals acquired in steps S102 and S104 are utilized to detect and calibrate the homodyne receiver 140. In more detail, two separated receiving paths; one from the transmitter observation receiver 130 (i.e., signal path 220) and one from the homodyne receiver 140 (i.e., signal path 230 or 310) are used for the baseband calibration module 210 to receive common stimulation source. The transmission signal is directly fed through the transmitter observation receiver 130 along signal path 220, and is fed through the homodyne receiver 140 along either signal path 230 or signal path 310. Thus, in order to perform the calibration also a signal from the homodyne receiver 140 is utilized. Hence, the baseband calibration module 210 is configured to, in a step S106, acquire a second received version of the transmission signal from a homodyne receiver 140 of the signal distribution network 200, 300, 400, 500. In this respect, the acquire module 710a may comprise instructions that when executed on the baseband calibration module 210 causes the processing circuitry 710 to, via the communications interface 720, acquire the second version of the transmission signal in order for the baseband calibration module 210 to perform step S106. The second received version corresponds to the transmission signal as transmitted by the homodyne transmitter 120 and received by the homodyne receiver 140.

The baseband calibration module 210 is then further configured to, in a step S108, calibrate the homodyne receiver 140. The baseband calibration module 210 is configured to calibrate the homodyne receiver 140 using a comparison of the first received version of the transmission signal as acquired in step S104 and the second received version of the transmission signal as acquired in step S106. In this respect, the calibrate module 710b may comprise instructions that when executed on the baseband calibration module 210 causes the processing circuitry 710 to calibrate the homodyne receiver 140 using a comparison of the first received version of the transmission signal as acquired in step S104 and the second received version of the transmission signal as acquired in step S106 in order for the baseband calibration module 210 to perform step S108. The baseband calibration module 210 is configured to in this comparison use the first received version of the transmission signal as a reference signal and the transmission signal as a calibration signal. The first received version of the transmission signal is used as a reference signal since the heterodyne transmitter observation receiver 130 is used as a reference receiver and, for purposes of the herein disclosed embodiments, thus assumed not to introduce any impairments that the homodyne receiver 140 is to be calibrated for (using the herein disclosed calibration procedure).

This enables real time receiver impairment detection and calibration using the normal transmission signal at TX time slots as calibration signal and the heterodyne transmitter observation receiver 130 as a reference receiver.

Embodiments relating to further details of calibrating a homodyne receiver 140 in a signal distribution network 200, 300, 400, 500 for time division duplex will now be disclosed.

There may be different examples of transmissions. For example, the transmission may represent transmission of a control signal or a data signal. There may be different ways for the heterodyne transmitter observation receiver 130 to process the transmission signal before it is acquired by the baseband calibration module 210 in step S114. According to an embodiment the transmission signal is in the heterodyne transmitter observation receiver 130 received as an analogue modulated intermediate frequency signal. The heterodyne transmitter observation receiver 130 is configured to low-pass filter, frequency down-convert, and digitize the transmission signal to define the first received version of the transmission signal. This embodiment corresponds to signal path 220.

There may be different ways for the homodyne receiver 140 to process the transmission signal before it is acquired by the baseband calibration module 210 in step S106. According to an embodiment the transmission signal is in the homodyne receiver 140 received as an analogue modulated zero intermediate frequency signal. The homodyne receiver 140 is configured to in-phase component and quadrature component demodulate, low-pass filter, and digitize the transmission signal to define the second received version of the transmission signal. This embodiment corresponds to signal paths 230 and 310.

As noted above, there may be different ways for the homodyne receiver 140 to receive the transmission signal from the homodyne transmitter 120. Two different embodiments relating thereto will now be disclosed.

A first embodiment corresponds to signal path 230 and is based on bypassing the LNA 157 and RF filter 156 in the radio circuitry 150 using the first coupler 240 and the second coupler 250. The first coupler 240 is placed after the switch 153 and the second coupler 250 is placed between the RF filter 156 and the variable gain amplifier 142.

A second embodiment corresponds to signal path 310 and is based on using pure signal leakage at the switch 153. Hence, according to this embodiment the analogue modulated zero intermediate signal has been fed to the 300 homodyne receiver 140 from the output of the homodyne transmitter 120 as a leakage signal. The leakage signal is may thus be fed to the homodyne receiver 140 from the output of the homodyne transmitter 120 without any extra couplers 240, 250.

For both embodiments the variable gain amplifier 142 can be used to control the signal at signal path 230. For the second embodiment the leakage signal has further been influenced by a variable gain and phase when passing through the switch 153, the low noise amplifier 157 and the band-pass filter 156. The leakage signal may thus have been subjected to low noise amplification and band-pass filtering before being subjected to the variable gain amplification by the variable gain amplifier 142. However, the leakage signal in the second embodiment will result in a frequency dependency and also have an unknown gain and phase response. As will be disclosed below with reference to FIG. 5, a filter can be used to compensate this frequency dependency and unknown gain and phase.

There may be different signals for the baseband calibration module 210 to calibrate the homodyne receiver 140. For example, the calibration may relate to IQ impairment detection and correction. Thus, the calibrating may relate to adjusting in-phase (I) component and quadrature (Q) component demodulation in the homodyne receiver 140.

There may be different examples of transmission signals to be acquired by the baseband calibration module 210. For example, the transmission signal may be a baseband signal in digital form (i.e., before DAC and IQ modulation in the homodyne transmitter 120). That is, the transmission signal being input to the homodyne transmitter 120 may be a digital baseband signal.

Reference is now made to FIG. 13 illustrating methods for calibrating a homodyne receiver 140 in a signal distribution network 200, 300, 400, 500 for time division duplex as performed by the baseband calibration module 210 according to further embodiments. Parallel references are continued to FIGS. 2 and 3.

Figure 4:
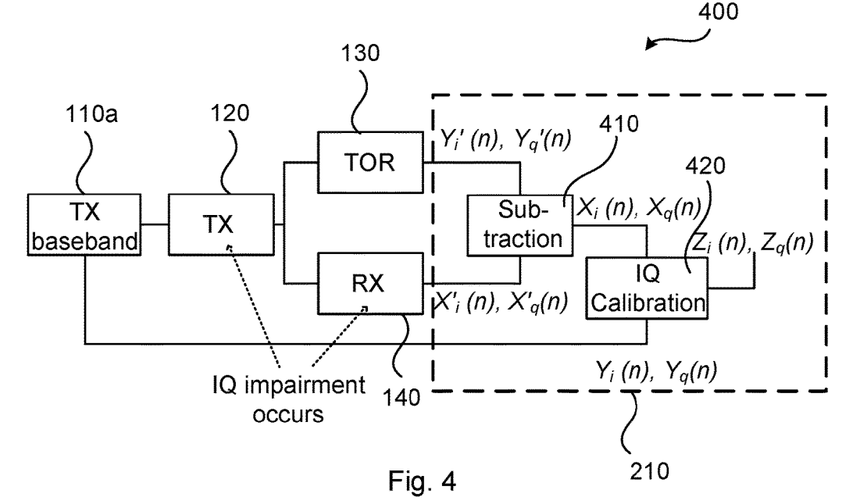
Figure 5:
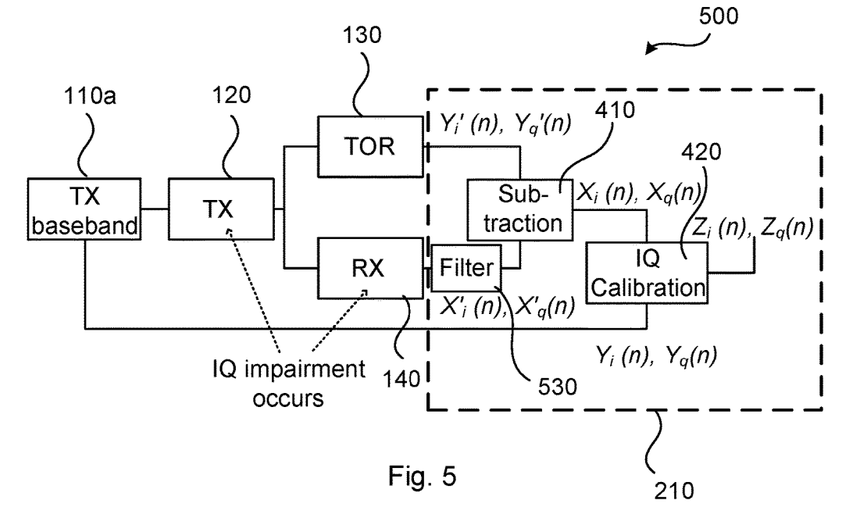

Simplified block diagrams illustrating how the herein disclosed baseband calibration module 210 can be configured for IQ impairment are shown in FIGS. 4 and 5. FIGS. 4 and 5 are schematic diagrams illustrating signal distribution networks 400, 500 according to embodiments. The signal distribution network 400 corresponds to the signal distribution network 200 of FIG. 2, and the signal distribution network 500 corresponds to the signal distribution network 300 of FIG. 3. In FIGS. 4 and 5 the baseband calibration module 210 is illustrated outside the baseband circuitry 110a for clarity.

In FIGS. 4 and 5 the notation $Y'_i(n)$, $Y'_q(n)$, where i denotes in-phase, where q denotes quadrature and where n=1, 2, . . . , N is a discrete time index, represents in-phase and quadrature signals processed by the heterodyne transmitter observation receiver 130 in which IQ impairments only involve transmitter residue IQ impairment after transmitter IQ correction.

Further, the notation $X'_i(n)$, $X'_q(n)$ represents in-phase and quadrature signals processed by the homodyne receiver 140 in which IQ impairment involves both transmitter residue IQ impairment and homodyne receiver IQ impairment. Assume that the baseband calibration module 210 is configured to determine a difference between these signals. Particularly, let $X_i(n)$, $X_q(n) = X'_i(n)$, $X'_q(n) - Y'_i(n)$, $Y'_q(n)$, where the subtraction operation is performed by a subtraction module 410. Here the signals $X_i(n)$, $X_q(n)$ thus indicate the homodyne receiver IQ impairment. Further, let $Z_i(n)$, $Z_q(n)$ be the output of an IQ calibration module 420 using the transmission in-phase and quadrature signals, denoted $Y_i(n)$, $Y_q(n)$, from the homodyne transmitter 120 as calibration signal. The baseband calibration module 210 may thus be configured to, perform the calibration by, in a step S108b, determine a difference between the first received version of the transmission signal and the second received version of the transmission signal. In this respect, the determine module 710c may comprise instructions that when executed on the baseband calibration module 210 causes the processing circuitry 710 to determine a difference between the first received version of the transmission signal and the second received version of the transmission signal in order for the baseband calibration module 210 to perform step S108b.

As will be further disclosed below, the calibration in step S108 may involve the determination of correction filter coefficients. Hence, the baseband calibration module 210 may be configured to, in a step S108c, determine correction filter coefficients. In this respect, the determine module 710c may comprise instructions that when executed on the baseband calibration module 210 causes the processing circuitry 710 to determine correction filter coefficients in order for the baseband calibration module 210 to perform step S108c. The correction filter coefficients may then be determined based on the difference as determined in step S108b and the transmission signal acquired in step S102. The correction filter coefficients may thereby define the calibration of the homodyne receiver 140. Particularly, the filter coefficients may be determined such that the signals $Z_i(n)$, $Z_q(n)$ are equal to, or almost equal to, the signals $Y_i(n)$, $Y_q(n)$.

As seen in the embodiment of FIG. 5 the signal distribution network 500, in comparison to the signal distribution network 400, additionally comprises a filter 530. This filter 530 is present to compensate the frequency dependency gain and phase response of the second received version of the transmission signal, see above. Hence, according to an embodiment the baseband calibration module 210 is configured to, in a step S108a, filter the second received version of the transmission signal before determining the difference in step S108b. In this respect, the filter module 710d may comprise instructions that when executed on the baseband calibration module 210 causes the processing circuitry 710 to filter the second received version of the transmission signal in order for the baseband calibration module 210 to perform step S108a.

Further details of how the correction filter coefficients may be determined will now be disclosed.

Figure 14:
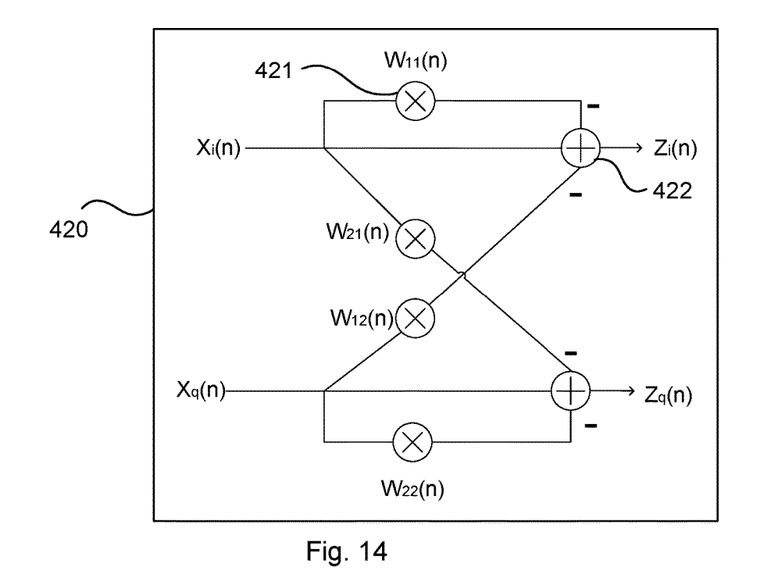
FIG. 14 is a schematic illustration of a calibration module according to an embodiment.

FIG. 14 schematically illustrates an embodiment of the calibration module 420. The calibration module 420 may be implemented as an adaptive filter, in which a least means square (LMS) filter may be used. As such the calibration module 420 comprises signal multipliers 421 and signal adders 422. Also other types of filters than LMS filters may be used in the calibration module 420. In FIG. 7 signals $Z_i(n)$, $Z_q(n)$ are in-phase and quadrature outputs of the adaptive filter. The notation $W_{xx}(n)$, where xx is 11, 12, 21, 22, denote filter coefficients, and as above, n is a discrete time index.

The filter applies a direct finite impulse response (FIR) filter and a cross branch FIR filter to each of the in-phase and quadrature signals from the homodyne receiver 140. In the illustrative embodiment of FIG. 14 the calibration module 420 comprises four FIR filters; an in-phase branch FIR filter, a quadrature branch FIR filter, a cross in-phase branch FIR filter, and a cross quadrature branch FIR filter.

Figure 15:
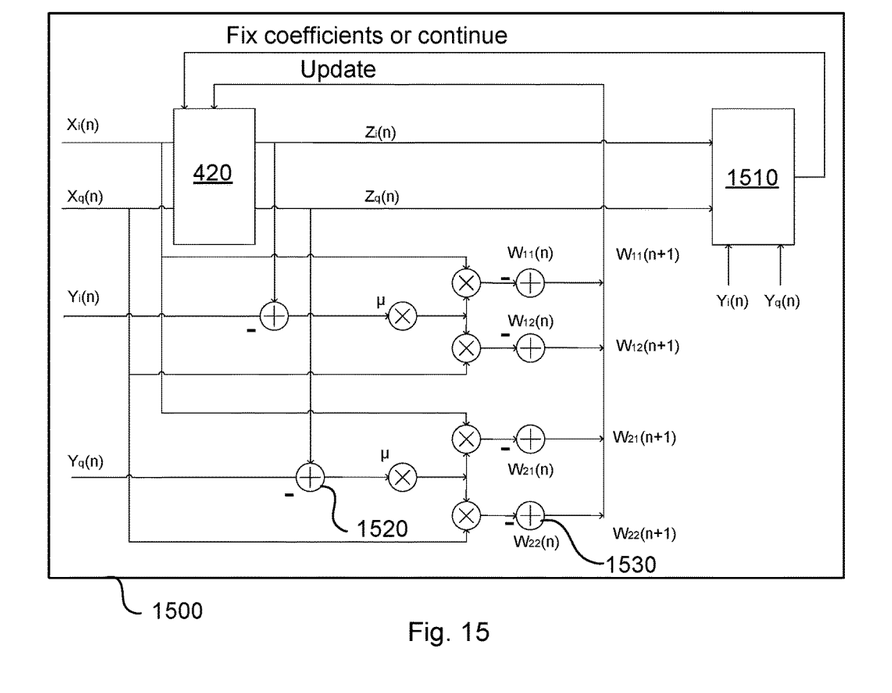
FIG. 15 is a schematic illustration of a filter coefficient update module according to an embodiment.

The filter coefficients may be adaptively updated. FIG. 15 schematically illustrates an embodiment of a filter coefficient update module 1500. The filter coefficient update module 1500 comprises a calibration module 420 as in FIG. 14, a comparison and decision module 1510 as well as signal adders 1520 and signal multipliers 1530. The comparison and decision module 1510 is configured to compare $Z_i(n)$, $Z_q(n)$ to $Y_i(n)$, $Y_q(n)$ so as to determine whether to continue the calibration operation or to fix the thus far determined filter coefficients based, for example, on reservation time for the calibration process, accuracy of the filter coefficients, and/or other requirements which need to be considered. The notation represents a scale factor used to control each update of the filter coefficients. Its value can be based on various considerations.

The thus determined correction filter coefficients may be used during a reception time slot of the signal distribution network 200, 300, 400, 500, 600. Particularly, the baseband calibration module 210 may be configured to, in a step S110, receive signalling (hereinafter denoted the received signalling) from the homodyne receiver 140 during a reception time slot of the signal distribution network 200, 300, 400, 500, 600. In this respect, the receive module 710e may comprise instructions that when executed on the baseband calibration module 210 causes the processing circuitry 710 to, via the communications interface 720, receive signalling from the homodyne receiver 140 in order for the baseband calibration module 210 to perform step S110. The baseband calibration module 210 may then be configured to, in a step S112, apply a result from the calibration as performed in step S108 to the received signalling. In this respect, the apply module 710f may comprise instructions that when executed on the baseband calibration module 210 causes the processing circuitry 710 to apply a result from the calibration as performed in step S108 to the received signalling in order for the baseband calibration module 210 to perform step S112. Applying the result may involve the baseband calibration module 210 to, in a step S112a, filter the received signalling using the correction filter coefficients. In this respect, the filter module 710fd may comprise instructions that when executed on the baseband calibration module 210 causes the processing circuitry 710 to filter the received signalling using the correction filter coefficients in order for the baseband calibration module 210 to perform step S112a.

Figure 6:
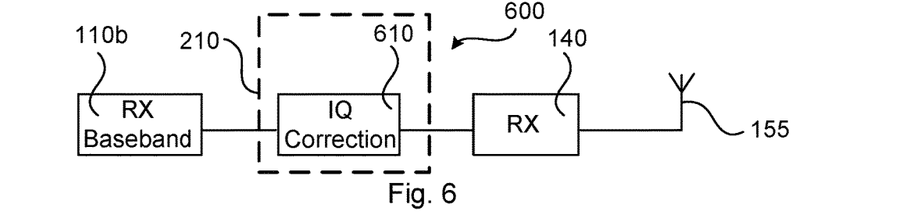

FIG. 6 is a schematic diagram illustrating a signal distribution network 600 according to embodiments. The signal distribution network 600 comprises a homodyne receiver 140 configured to receive a signal from an antenna 155. The signal distribution network 600 further comprises a baseband calibration module 210 as herein disclosed which in turn comprises an IQ correction module 610 configured to receive a signal from the homodyne receiver 140 and to correct the received signalling in terms of IQ impairments introduced by the homodyne receiver 140. As disclosed above, the baseband calibration module 210 may be configured to correct the received signalling by subjecting the received signalling to filtering using the filtering coefficients $W_{xx}(n)$ for n=1, 2, ..., N. Hence the IQ correction module 610 may implement such filtering of the received signalling. The thus corrected received signalling may then be subjected to further processing in the baseband circuitry 110b. In FIG. 6 the baseband calibration module 210 is illustrated outside the baseband circuitry 110b for clarity.

The received signalling may be received during a reception time slot of the signal distribution network 200, 300, 400, 500, 600. For implementation of the baseband calibration module 210 in a network node 900 as in FIG. 9 this corresponds to an uplink time slot; for implementation of the baseband calibration module 210 in a wireless terminal 1000 as in FIG. 10 this corresponds to a downlink time slot.

The transmission as acquired by the baseband calibration module 210 in steps S102, S104, S106 may by the baseband calibration module 210 be acquired during a transmission time slot of the signal distribution network 200, 300, 400, 500. For implementation of the baseband calibration module 210 in a network node 900 as in FIG. 9 this corresponds to a downlink time slot; for implementation of the baseband calibration module 210 in a wireless terminal 1000 as in FIG. 10 this corresponds to an uplink time slot.

Figure 16:
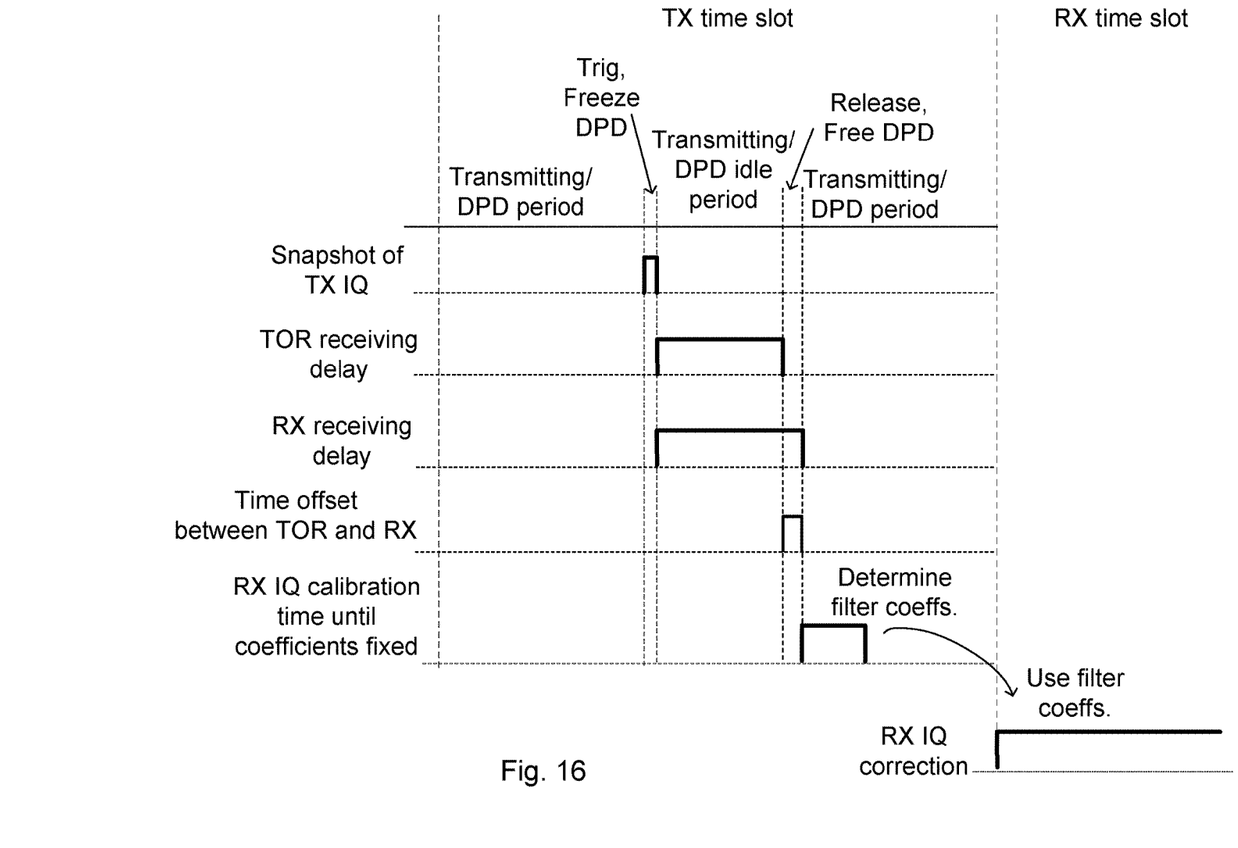
FIG. 16 is a time sequence diagram according to an embodiment.

FIG. 16 is a time sequence diagram according to an embodiment. FIG. 16 demonstrates time windows (not drawn to scale) for operation of the herein disclosed calibration that does not affect other operation of the signal distribution network 200, 300, 400, 500, 600. FIG. 16 illustrates an embodiment where the baseband calibration module 210 is implemented in a network node 900 and where the calibration thus is performed during downlink time slots (one of which is represented by the TX time slot in FIG. 16) and where a result of the calibration is applied during uplink time slots (one of which is represented by the RX time slot in FIG. 16). In more detail, when a digital pre-distorter (DPD) enters an idle period it will trigger the calibrating of the homodyne receiver 140, as performed by the baseband calibration module 210. Meanwhile, the homodyne transmitter 120 may still continue transmitting. After reception in the heterodyne transmitter observation receiver 130 is completed, a release signal will trigger the signal distribution network 200, 300, 400, 500, 600 to return to normal operation. Through this sequence, no transmitted signals are impacted by the calibration. If implemented in a network node 900 so-called downlink pilot time slots (DwPTSs) can be used as an example of when the calibration as herein disclosed is applied. One advantage is that the time is closest to uplink timeslots.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For example, although separate embodiments, with references to FIGS. 4, 5, 6, have been disclosed for transmission, where calibration is performed, and reception, where correction is performed, it is understood by the skilled person that these separate embodiments are readily combined and thus that one and the same baseband calibration module 210 can implement both embodiments for calibration and correction, respectively.

The invention claimed is:

1. A method for calibrating a homodyne receiver in a signal distribution network for time division duplex, the method being performed by a baseband calibration module, the method comprising:
   acquiring a transmission signal being input to a homodyne transmitter of the signal distribution network;
   acquiring, from a heterodyne transmitter observation receiver of the signal distribution network, a first received version of said transmission signal;
   acquiring, from a homodyne receiver of the signal distribution network, a second received version of said transmission signal; and,
   calibrating the homodyne receiver using a comparison of said first received version of said transmission signal and said second received version of said transmission signal, using said first received version of said transmission signal as a reference signal, and using said transmission signal as a calibration signal.

2. The method according to claim 1, wherein said transmission signal being input to the homodyne transmitter is a digital unmodulated baseband signal.

3. The method according to claim 1, wherein said transmission signal in the heterodyne transmitter observation receiver has been received as an analogue modulated intermediate frequency signal, and in the heterodyne transmitter observation receiver been low-pass filtered, frequency down-converted, and digitized to define said first received version of the transmission signal.

4. The method according to claim 1, wherein said transmission signal in the homodyne receiver has been received as an analogue modulated zero intermediate frequency signal, and in the homodyne receiver been in-phase component and quadrature component demodulated, low-pass filtered, and digitized to define said second received version of the transmission signal.

5. The method according to claim 4, wherein said analogue modulated zero intermediate frequency signal has been fed to the homodyne receiver from the homodyne transmitter output as a leakage signal.

6. The method according to claim 5, wherein said leakage signal is fed to the homodyne receiver from the homodyne transmitter output.

7. The method according to claim 4, wherein said leakage signal has been subjected to variable gain amplification before being received by the homodyne receiver.

8. The method according to claim 7, wherein said leakage signal has been subjected to low noise amplification and a band-pass filtering before being subjected to said variable gain amplification.

9. The method according to claim 1, wherein said calibrating relates to adjusting in-phase component and quadrature component demodulation in the homodyne receiver.

10. The method according to claim 1, wherein said calibrating comprises determining correction filter coefficients.

11. The method according to claim 10, wherein said calibrating comprises:
    determining a difference between said first received version of said transmission signal and said second received version of said transmission signal; and,
    wherein the correction filter coefficients are determined based on said difference and said transmission signal, said correction filter coefficients defining calibration of the homodyne receiver.

12. The method according to claim 1, further comprising:
    receiving signalling from the homodyne receiver during a reception time slot of the signal distribution network; and,
    applying a result from said calibrating to said received signalling.

13. A baseband calibration module for calibrating a homodyne receiver in a signal distribution network for time division duplex, the baseband calibration module comprising processing circuitry, the processing circuitry being configured to cause the baseband calibration module to perform a set of operations comprising:
    acquiring a transmission signal being input to a homodyne transmitter of the signal distribution network;
    acquiring, from a heterodyne transmitter observation receiver of the signal distribution network, a first received version of said transmission signal;
    acquiring, from a homodyne receiver of the signal distribution network, a second received version of said transmission signal; and,
    calibrating the homodyne receiver using a comparison of said first received version of said transmission signal and said second received version of said transmission signal, using said first received version of said transmission signal as a reference signal, and using said transmission signal as a calibration signal.

14. The baseband calibration module according to claim 13, further comprising a storage medium storing said set of operations, and wherein the processing circuitry is configured to retrieve said set of operations from the storage medium to cause the baseband calibration module to perform said set of operations.

15. The baseband calibration module according to claim 13, wherein said set of operations is provided as a set of executable instructions.

16. A signal distribution network comprising a baseband calibration module according to claim 13.

17. A network node comprising a baseband calibration module according to claim 13.

18. A wireless terminal comprising a baseband calibration module according to claim 13.

19. A computer program for calibrating a homodyne receiver in a signal distribution network for time division duplex, the computer program comprising computer code which, when run on processing circuitry of a baseband calibration module, causes the baseband calibration module to:

acquire a transmission signal being input to a homodyne transmitter of the signal distribution network;

acquire, from a heterodyne transmitter observation receiver of the signal distribution network, a first received version of said transmission signal;

acquire, from a homodyne receiver of the signal distribution network, a second received version of said transmission signal; and, calibrate the homodyne receiver using a comparison of said first received version of said transmission signal and said second received version of said transmission signal, using said first received version of said transmission signal as a reference signal, and using said transmission signal as a calibration signal.

20. A computer program product comprising a computer program according to claim 19, and a computer readable means on which the computer program is stored.

* * * * *